(12) United States Patent
Schluessler et al.

(10) Patent No.: US 8,601,273 B2
(45) Date of Patent: Dec. 3, 2013

(54) SIGNED MANIFEST FOR RUN-TIME VERIFICATION OF SOFTWARE PROGRAM IDENTITY AND INTEGRITY

(75) Inventors: Travis Schluessler, Hillsboro, OR (US); David Durham, Beaverton, OR (US); George Cox, Hillsboro, OR (US); Karanvir Ken Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 13/118,017

(22) Filed: May 27, 2011

(65) Prior Publication Data

US 2011/0231668 A1    Sep. 22, 2011

Related U.S. Application Data

(62) Division of application No. 11/173,851, filed on Jun. 30, 2005, now Pat. No. 7,953,980.

(51) Int. Cl.
 *H04L 9/32* (2006.01)

(52) U.S. Cl.
 USPC ........... 713/176; 713/179; 713/180; 717/126; 711/216

(58) Field of Classification Search
 USPC ................. 713/176, 187, 179, 180, 181, 191; 717/126; 711/216; 380/204
 See application file for complete search history.

(56) References Cited

U.S. PATENT DOCUMENTS

| | | | |
|---|---|---|---|
| 5,301,287 A | 4/1994 | Herrell et al. | |
| 5,312,673 A | 5/1994 | Dressler | |
| 5,379,400 A | 1/1995 | Barakat et al. | |
| 5,619,723 A | 4/1997 | Jones et al. | |
| 5,634,043 A | 5/1997 | Self et al. | |
| 5,687,370 A | 11/1997 | Garst et al. | |
| 5,751,989 A | 5/1998 | Harrison | |
| 5,926,549 A | 7/1999 | Pinkas | |
| 5,944,821 A | 8/1999 | Angelo | |
| 5,966,531 A | 10/1999 | Skeen et al. | |
| 5,987,557 A | 11/1999 | Ebrahim | |
| 5,991,881 A | 11/1999 | Conklin et al. | |
| 6,101,586 A | 8/2000 | Ishimoto et al. | |
| 6,105,137 A | 8/2000 | Graunke et al. | |

(Continued)

FOREIGN PATENT DOCUMENTS

| WO | WO-9847072 | 10/1998 |
|---|---|---|
| WO | WO-0142874 | 6/2001 |

OTHER PUBLICATIONS

Office Action mailed Jun. 7, 2007 for U.S. Appl. No. 11/173,142.

(Continued)

*Primary Examiner* — April Y Blair
(74) *Attorney, Agent, or Firm* — Blakely, Sokoloff, Taylor & Zafman LLP (57) ABSTRACT

A measurement engine performs active platform observation. A program includes an integrity manifest to indicate an integrity check value for a section of the program's source code. The measurement engine computes a comparison value on the program's image in memory and determines if the comparison value matches the expected integrity check value. If the values do not match, the program's image is determined to be modified, and appropriate remedial action can be triggered. The integrity manifest can include a secure signature to verify the validity of the integrity manifest.

21 Claims, 6 Drawing Sheets

(56) References Cited

U.S. PATENT DOCUMENTS

| | | | |
|---|---|---|---|
| 6,163,834 | A | 12/2000 | Garcia et al. |
| 6,321,276 | B1 | 11/2001 | Forin |
| 6,487,643 | B1 | 11/2002 | Khare et al. |
| 6,496,847 | B1 | 12/2002 | Bugnion et al. |
| 6,542,919 | B1 | 4/2003 | Wendorf et al. |
| 6,553,438 | B1 | 4/2003 | Coffman et al. |
| 6,567,897 | B2 | 5/2003 | Lee et al. |
| 6,658,515 | B1 | 12/2003 | Larson et al. |
| 6,671,791 | B1 | 12/2003 | McGrath |
| 6,684,305 | B1 | 1/2004 | Deneau |
| 6,738,882 | B1 | 5/2004 | Gau |
| 6,751,720 | B2 | 6/2004 | Barroso et al. |
| 6,751,737 | B1 | 6/2004 | Russell et al. |
| 6,760,787 | B2 | 7/2004 | Forin |
| 6,823,433 | B1 | 11/2004 | Barnes et al. |
| 6,832,257 | B1 | 12/2004 | Gamo |
| 6,931,540 | B1 | 8/2005 | Edwards et al. |
| 6,961,852 | B2 | 11/2005 | Craft |
| 6,996,551 | B2 | 2/2006 | Hellerstein et al. |
| 7,010,630 | B2 | 3/2006 | Pagan |
| 7,028,229 | B2 | 4/2006 | McGuire et al. |
| 7,093,295 | B1 | 8/2006 | Saito |
| 7,103,779 | B2 * | 9/2006 | Kiehtreiber et al. .......... 713/187 |
| 7,225,325 | B2 | 5/2007 | Rhoades |
| 7,328,453 | B2 | 2/2008 | Merkle, Jr. et al. |
| 7,409,472 | B2 | 8/2008 | Iwatani et al. |
| 7,478,394 | B1 | 1/2009 | de Dinechin et al. |
| 7,506,122 | B1 | 3/2009 | Agesen et al. |
| 7,542,026 | B2 | 6/2009 | Pagan |
| 7,581,256 | B2 | 8/2009 | Cockerille et al. |
| 7,603,484 | B2 | 10/2009 | Dai et al. |
| 2001/0014157 | A1 | 8/2001 | Hashimoto et al. |
| 2002/0029308 | A1 | 3/2002 | Babaian et al. |
| 2002/0120871 | A1 | 8/2002 | Watkins et al. |
| 2002/0129212 | A1 | 9/2002 | Lee et al. |
| 2003/0005239 | A1 | 1/2003 | Dover |
| 2003/0005272 | A1 | 1/2003 | Nalawadi et al. |
| 2003/0037237 | A1 | 2/2003 | Abgrall et al. |
| 2003/0061540 | A1 | 3/2003 | Lee et al. |
| 2003/0097496 | A1 | 5/2003 | Gabryjelski |
| 2003/0135685 | A1 | 7/2003 | Cowan |
| 2003/0159055 | A1 | 8/2003 | Robbins et al. |
| 2003/0217250 | A1 | 11/2003 | Bennett et al. |
| 2003/0229794 | A1 | 12/2003 | Sutton et al. |
| 2003/0229808 | A1 | 12/2003 | Heintz et al. |
| 2003/0235310 | A1 | 12/2003 | Saito et al. |
| 2004/0030911 | A1 | 2/2004 | Isozaki et al. |
| 2004/0039924 | A1 | 2/2004 | Baldwin et al. |
| 2004/0044872 | A1 | 3/2004 | Scott |
| 2004/0153998 | A1 | 8/2004 | McGuire et al. |
| 2004/0221200 | A1 | 11/2004 | Armstrong et al. |
| 2004/0226009 | A1 | 11/2004 | Mese et al. |
| 2004/0268013 | A1 | 12/2004 | Pagan |
| 2005/0027988 | A1 * | 2/2005 | Bodrov ........................ 713/176 |
| 2005/0132122 | A1 | 6/2005 | Rozas |
| 2005/0138417 | A1 | 6/2005 | McNerney et al. |
| 2005/0198051 | A1 | 9/2005 | Marr et al. |
| 2005/0213768 | A1 | 9/2005 | Durham et al. |
| 2005/0216577 | A1 | 9/2005 | Durham et al. |
| 2005/0278499 | A1 | 12/2005 | Durham et al. |
| 2005/0278563 | A1 | 12/2005 | Durham et al. |
| 2005/0289311 | A1 | 12/2005 | Durham et al. |
| 2005/0289542 | A1 | 12/2005 | Uhlig et al. |
| 2006/0026569 | A1 * | 2/2006 | Oerting et al. ................ 717/126 |
| 2006/0156398 | A1 | 7/2006 | Ross et al. |
| 2006/0161761 | A1 | 7/2006 | Schwartz et al. |
| 2006/0236125 | A1 | 10/2006 | Sahita et al. |
| 2006/0294596 | A1 | 12/2006 | Govindarajan et al. |
| 2007/0005935 | A1 | 1/2007 | Khosravi et al. |
| 2007/0005957 | A1 | 1/2007 | Sahita et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0094725 | A1 | 4/2007 | Borders |
| 2007/0156999 | A1 | 7/2007 | Durham et al. |

OTHER PUBLICATIONS

Office Action mailed Jun. 20, 2007 for U.S. Appl. No. 11/428,335.
Final Office Action mailed Mar. 6, 2008 for U.S. Appl. No. 11/428,335.
Final Office Action mailed Feb. 13, 2008 for U.S. Appl. No. 11/173,142.
Office Action for U.S. Appl. No. 11/171,859, mailed Jan. 21, 2009, 7 pages.
Office Action mailed Oct. 22, 2008 for U.S. Appl. No. 11/173,142.
Office Action for U.S. Appl. No. 11/173,587 mailed Dec. 5, 2008.
Office Action for U.S. Appl. No. 11/428,335 mailed Oct. 20, 2008.
Office Action for U.S. Appl. No. 11/174,315 mailed Feb. 17, 2009.
Office Action mailed Apr. 1, 2009 for U.S. Appl. No. 11/173,851.
Notice of Allowance for U.S. Appl. No. 11/173,851 mailed Aug. 13, 2009.
Non-Final Office Action mailed Aug. 21, 2009 for U.S. Appl. No. 11/322,669.
Final Office Action for U.S. Appl. No. 11/174,315 mailed Sep. 1, 2009.
Final Office Action mailed Jul. 15, 2009 for U.S. Appl. No. 11/173,142.
Notice of Allowance mailed Apr. 24, 2009 for U.S. Appl. No. 11/428,335.
Notice of Allowance for U.S. Appl. No. 11/171,859, mailed Jun. 19, 2009, 3 pages.
Notice of Allowance for U.S. Appl. No. 11/173,587, mailed May 1, 2009.
Office Action for U.S. Appl. No. 11/173,815, mailed Jun. 20, 2007.
Notice of Allowance for U.S. Appl. No. 11/171,859, Mailed Oct. 6, 2009.
International Search Report and Written Opinion from PCT/US/2005/022577 Nov. 24, 2005.
International Preliminary Report on Patentability from PCT/US/2005/022577 mailed Jan. 9, 2007.
Office Action for U.S. Appl. No. 10/881,777, Mailed Sep. 5, 2007, Whole Document.
Office Action mailed Dec. 14, 2009 for U.S. Appl. No. 11/173,885.
Office Action mailed Jan. 21, 2010 for U.S. Appl. No. 11/173,851.
Notice of Allowance for U.S. Appl. No. 11/322,669, Mailed Mar. 8, 2010, 11 pages.
"Windows Platform Design Notes: Standardizing Out-Of-Band Management Console Output and Terminal Emulation (VT-UTF8 and VT100+)", Oct. 24, 2001, 15 pages, http://download.microsoft.com/download/1/6/1/161ba512-40e2-4cc9-843a-923143f3456c/StandardizingOutOfBandManagementConsoleOutput090.doc.
Apple Computer, Inc., "Mac OS X ABI Mach-o File Format Reference", Mar. 8, 2006 64 pages (copyright 2003, 2006 Apple, Inc.).
Collins, "Intel's System Management Mode", 1999, 8 pages, http://www.rcolling.org/ddj/Jan97/Jan97.html.
Draheim, "AMD64/EM64T—The Coming Market", May 4, 2004, 5 pages, http://www2.informatik.hu-berlin.de/~draheim/article/em64t.html.
Duc, G., et al., "CryptoPage: An Efficient Secure Architecture with Memory Encryption, Integrity and Information Leakage Protection", Computer Security Applications COnference, 2006, ACSAC, 22nd Annual. Dec. 2006, pp. 483-492.
Grevstad, "CPU-Based Security: The NX Bit", Juniperimages, May 24, 2004, 3 pages.
Khosravi, Hormuzd M., et al., "Dynamic Generation of Integrity Manifest for Run-Time Verification of Software Program", U.S. Appl. No. 11/967,928—Date Filed Dec. 31, 2007, 41 pages.
Levy, J., et al., "Hiding Your Wares: Transparently Retrofitting Memory Confidentiality into Legacy Applications", Communications, 2007. ICC, IEEE International Conference on Jun. 24-28, 2007, pp. 1368-1372.
Markatos, et al., "User-Level DMA without Operating System Kernel Modification", Feb. 1-5, 1997, pp. 322-331: High Performance Computer ARchitecture, 1999, IEEE 3rd International Symposium.
Microsoft Corp., "Microsoft Portable Executable and Common Object File Format Specification", Revision 6,0, Feb. 1999, 77 pages.
Red Hat, Inc., "Red Hat Enterprise Linux 4: Using as, the Gnu Assembler", copyright 2004, 302 pages.

(56) References Cited

OTHER PUBLICATIONS

Sheveley, "Enhanced Virtualization on Intel Architecture-Based Servers", Technology@Intel Magazine, Apr. 2005, pp. 1-9.

The PC Guide, "Direct Memory Access (DMA) Modes and Bus Mastering DMA", Apr. 17, 2001; 3 pages; http://www.pcguide.com/ref/hdd/if/ide/modesDMA-c.html.

Tools Interface Standards (TIS), "Executable and Linkable Format (ELF)", Portable Formats Specification, Version 1.1, 262 pages; TIS Committee, Oct. 1993.

Uhlig, Rich, et al., "Intel Virtualization Technology", IEEE Computer Society, May 2005, pp. 48-56.

Wagle, Perry, "StackGuard: Simple Stack Smash Protection for GCC", Imunix, Inc, GCC Developers Summit 2003, (Aug. 2001), 243-256.

Webopedia, "Bus", Dec. 1, 2002, http://isp.webopedia.com/TERM/B/bus.html.

Webopedia, "DMA", Nov. 11, 2003, 2 pages, http://www.webopedia.com/TERM/DMA.html.

Webopedia, "Kernel", Mar. 12, 2002, 2 pages, http:..www.webopedia.com/TERM/k/kernel.html.

Yan, Chenyu, et al., "Improving COst, Performance, and Security of Memory Encryption and Authentication", Computer Architecture, 2006. ISCA, 33rd International Symposium, pp. 179-190.

Zhang, "Memory Management in JikesNode Operating System", 2005, A thesis submitted to the University of Manchester for the degree of Master of Science in the Faculty of Science and Engineering, pp. 1, 27 and 29.

Office Action from U.S. Appl. No. 11/984,001, mailed Apr. 6, 2011, 12 pages.

McCune, Jonathan M., et al., "*Bump in Ether: A Framework for Securing Sensitive User Input*", 2006, *USENIX Annual Technical Conference*, pp. 185-198.

Yoshihama, Sachiko, et al., "*WS-Attestation: Enbling Trusted Computing on Web Services*", Oct. 2006, IBM Japan, pp. 1-26.

\* cited by examiner

SIGNED MANIFEST FOR RUN-TIME VERIFICATION OF SOFTWARE PROGRAM IDENTITY AND INTEGRITY

This U.S. Patent Application is a Divisional of, and claims the benefit of priority of application Ser. No. 11/173,851 filed Jun. 30, 2005.

RELATED APPLICATIONS

This application is related to patent application Ser. No. 11/173,142, entitled "Systems and Methods for Remote Triggering of Page Faults," of Khosravi et al., and filed on Jun. 30, 2005; patent application Ser. No. 11/173,815, entitled "Systems and Methods for Host Virtual Memory Reconstitution," of Khosravi et al., and filed on Jun. 30, 2005; patent application Ser. No. 11/149,726, entitled "Systems, Apparatuses, and Methods for a Host Software Presence Check from an Isolated Partition," of Hahn et al., and filed on Jun. 9, 2005; patent application Ser. No. 11/173,885, entitled "Systems and Methods for Secure Host Resource Management," of Durham et al., and filed on Jun. 30, 2005; patent application Ser. No. 11/173,587, entitled "Generating and communicating Information on Locations of Program Sections in Memory," of Savagaonkar et al., and filed on Jun. 30, 2005; patent application Ser. No. 11/171,859, entitled "Agent Presence Monitor Configured to Execute in a Secure Environment," of Sahita et al., and filed on Jun. 30, 2005.

FIELD

Embodiments of the invention relate to electronic system security, and more specifically to a signed manifest to verify the identity and integrity of a software program.

BACKGROUND

Determining the identity of a software program is a prerequisite to performing operations in many computer or other electronic systems. The identity of a software program has traditionally been tied with the possession or association of secret credentials or keys that only the identified program is supposed to have. Thus, a software program is traditionally presumed to be identified if the credentials are received in response to an identity request. However, most traditional credentials are completely transferable, meaning that if another software program "steals" and presents the credentials, it is presumed to be the software program associated with the credentials. Thus, if a malware attack takes control of a system, the attacker may obtain access to secret credentials by virtue of having access to all the resources on the compromised host. For example if a program stored its secret key (or the algorithm for retrieving or generating the secret key) in main memory or on a hard disk, an attacking program that gained unrestricted access to main memory or the hard disk could subsequently obtain the secret keys. The successful attacker could then masquerade as the real software program whose identity was associated with the secret key.

Attacks that compromise the ability to determine with certainty the identity of a software program may be classified as different types for purposes of discussion herein. Other classifications are possible. For purposes of description, the true software program to which the identity belongs may be referred to as the program of interest. One type of attack is one in which an attacker attempts to stop the program of interest from executing. Stopping execution of the program of interest can be accomplished by crashing the program or an operating system on which the program is running by modifying the machine code to result in an invalid machine instruction or other fatal fault. Alternately, data associated with the program of interest could be modified, for example, to cause a segmentation fault by changing an array bound. As another alternative, the program could be unloaded from the process table of a task manager to prevent the program from being scheduled for execution.

Another type of attack involves the attacker modifying the program of interest to cause it to perform an operation other than what was originally intended for the program. For example, an attacker may use the compromised host system to execute code to propagate a worm, or code to perform a denial of service attack against a remote target. One way to cause the program of interest to perform an unintended operation is exploitation of an input buffer or stack overflow vulnerability.

Another type of attack involves tampering with the program of interest. Program tampering is demonstrated when an attack successfully modifies the program of interest and attempts to hide its modifications. Hiding its modifications can be considered to be a form of covering the attacker's tracks. An example of program tampering is an attack that modifies the program of interest, executes the modifications, and then reverts the modifications to restore the program of interest to its original state.

Each of these types of attacks can be successfully executed on traditional systems because of their lack of ability to securely identify the software program of interest.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Descriptions of certain details and implementations follow. Reference may be made herein to an "embodiment," which may be understood as describing a particular feature, structure, or characteristic included in at least one embodiment of the invention. Thus, the appearance of phrases such as "in one embodiment," or "in an alternate embodiment" may describe various embodiments and implementations of the invention, and may not necessarily all refer to the same embodiment.

In traditional systems, the concept of software program identity generally refers to possession of a value or key that represents nothing about the program, but is merely associated with a program. As explained above, traditional systems merely assume that possession of a key proves identity, which may be an unfounded assumption. The effects of the types or classes of attack discussed above can be prevented or reduced by using an alternate identity mechanism. The identity of a software program can be defined by two attributes: first, a listing of relocation fix-ups that occur at the time the program is loaded into memory; second, an agent signature. The agent signature includes an integrity check value (ICV) or test value/identity test/verification value that may cover the program's executable code store, static configuration data, dynamic configuration data, and the listing of relocation fix-ups. A relocation fix-up will be discussed more fully below, and briefly may be described as referring to an offset applied to a location the source of a program that references a program/routine/function that has a variable location based on where in memory the program is loaded. Collectively the listing of relocation fix-ups and ICV can be referred to as a software program's identity. When they are stored or used together, they can be referred to as a software program's "integrity manifest," Thus, as used herein, a program's integrity manifest may be considered to be a collection of information that provides the program's identity.

The use of an integrity manifest, and verification of the integrity manifest can prevent one type of attack by detecting when modified code is present and disallowing the modified code source to execute. Another type of attack can be prevented by disallowing the use of a function of the software program without proper identification. Because an attacking program cannot provide a proper manifest, as described below, the function can be prevented. Another attack type is if an attacker were to attempt to forge or modify the integrity manifest. Such an attack can be prevented by virtue of a signature of the integrity manifest.

To manage and monitor the use of the integrity manifest as a program identifier, a host system may be monitored with an active management platform. The active management platform may include a service processor, either as separate hardware or as a secure partition, thread, virtual machine, etc., in the host system, and one or more software/firmware modules executing on the service processor to provide management/monitoring functions. An active management module with a measurement engine could provide certain services to provide safeguards against the types of attack mentioned. These services may include at least: detecting a state of the measured program's execution (e.g., agent presence), detecting if the measured program's executable code or configuration data has been modified in memory, and detecting if the measured program's configuration data has been modified by another entity. For certain attacks, one or more of these services may be sufficient to provide safeguards as to identity and integrity of the software program. Other services could also be provided by the active management module.

The active management platform may be, or include one or more hardware and/or software component that operate outside the context of an operating system on a host. By running outside the context of, or independently of, or in a manner/mode inaccessible by, the operating system, the active management platform may have monitoring/management capabilities and/or security attributes not present in the context of the operating system. One implementation may include a privileged execution mode on a host processor that runs outside the context of the operating system. Alternate implementations may include a service processor, which may be a separate microcontroller/processor, and/or firmware executed on a controller on the hardware platform.

In one embodiment the active management module includes one or more measurement engines to perform integrity and execution detection checks on a program of interest. In one embodiment the integrity and execution detection checks are performed on, or in conjunction with, agents that provide the data necessary to determine the integrity of the program of interest. The measurement engine and the agent may both be software modules executed on the host machine. In one embodiment the measurement engine uses direct memory access (DMA) to obtain the data on which it will perform an integrity check. When the measurement engine detects a failure it can notify other components of the system and/or take/cause remedial action.

The measurement engine monitors/measures what may be referred to as a protected host software agent, which may be a program, such as the "program of interest" described above, on the host that is to be protected from modification or malicious termination. As used herein for purposes of simplicity of description, and not by way of limitation, the term "agent" refers to any software agent, program, or other group or associated sequence of instructions that may be monitored by the measurement engine. Possible examples of an agent are a device driver, a kernel agent (e.g., a firewall), a security service (e.g., software from BlackICE Software, Inc.), an operating system (OS) invariant component (e.g., a loader, a symbol table), and/or other program or OS component to be protected. In one embodiment the monitoring and measurement of an agent includes the use of information the agent itself can provide. The information may be included in an integrity manifest, as previously described. To provide this information may require a modification of the software agents, and could be implemented in source code. In one embodiment an agent initialization module is compiled into the agent to perform services to enable the measurement of the agent. In another embodiment an agent initialization module external to the agent interfaces with the protected agent. Among other functions, the agent module can perform memory manipulation (e.g., page pinning), generation of reports indicating the resources of the agent, recordation of relocation fix-up values, and functions involved in the registration of agents with the measurement engine. The agent module may also provide functionality for secure modification to dynamic configuration data.

Agents can be associated with a measurement engine, in that a measurement engine is responsible for monitoring/measuring/determining the integrity of an agent. The measurement engine performs integrity checks on one or more agents for which it is responsible. The integrity checks can be at the time of registration of the agent with the measurement engine and/or periodically or in an event-driven manner while the host system is in operation. Integrity checks at registration can ascertain that the initial state of the program as it exists in memory or on disk is identical to the state of the program at the time it was manufactured (e.g., the identity of a program), while periodic or event-driven integrity checks can detect attacks that change the protected attributes of a program. Registration refers to an operation or series of operations performed to provide the measurement engine with knowledge of the agent, information regarding the agent, etc., at the time an agent is loaded into system memory. Periodic integrity checks refer to checks made in a cyclic, timed, or randomly-timed fashion, for example, based on a counter or some other mechanism. Event-driven integrity checks may be performed in conjunction with one or more operations of the agent. For example, prior to and/or after executing changes to configuration parameters of an agent, sending of a data packet, terminating execution of the agent, or other event, an integrity check could be performed on some subset or the entirety of the agent. In general, an integrity check can be described as follows, which is merely illustrative of one implementation, and is not to be understood as limiting.

In one embodiment an integrity check at the time of registration includes generating cryptographic hashes across all regions that represent an agent's identity. The agent's identity includes the executable code, static configuration data, and relocation fix-ups. The various components of the agent's identity can be used to generate particular integrity check values (ICVs). The ICVs are included in the agent's integrity manifest and can be verified to determine the identity and integrity of the agent. The computed hash is compared against a known/expected value for the agent that may have been generated at the time the agent was manufactured. This known value can be a value or set of values stored in the agent's integrity manifest in storage. Depending on the results of the comparison, an integrity check may continue, or trigger a remedial response if the test fails. Another example could be an event drive integrity check that only performs the checks on the ICVs for certain relevant sub-sections of the program. For example, if the program happened to be transmitting a packet, an event-driven mechanism could verify the executable code and/or configuration data representing the transmit path, as opposed to the entire program that would include the receive path that is irrelevant to the transmission of packets.

In order to generate the ICVs, the measurement engine should be able to read the content that defines the agent. One implementation for reading agent content includes physical memory page pinning. Another implementation may include learning virtual memory addresses. In one embodiment the content of the measured agent is presented in physical memory mode to the measurement engine as one or more DMA memory scan records. To access the content as a DMA memory scan report, the content should reside permanently in its entirety within physical memory. Traditionally, when a program is loaded, the loader simply maps the file system pages into virtual memory pages, and the entirety of the content does not reside in physical memory. Traditionally, when a processor (e.g., a central processing unit (CPU)) needs to read the actual content referenced in a virtual memory page, the virtual memory manager will copy the contents of the corresponding file system page into a real physical memory page that can then be accessed by the processor. When the contents remain unused for long enough, the physical memory page is reused for other purposes. The traditional approach of keeping only a program content reference in virtual memory, and not in physical memory, impedes the ability of making a DMA memory scan, because the data to be measured could be in unpredictable physical memory locations, and may not even be in physical memory at all.

Program content can be retained in physical memory through a mechanism referred to as "page pinning." However, OSs generally place significant restrictions on how pages are pinned in physical memory. For example, typically an OS limits the amount of contiguous space that can be allocated in a single chunk (e.g., kmalloc of the Linux OS supports only up to 128 KB), one embodiment an agent initialization module (AIM) is inserted into the agent's code at compile time to ensure the agent's code store and measured configuration data exist in pinned physical pages of memory. The AIM describes each non-contiguous region used by the agent for storage of the program or data in reports relating to the measured agent.

In one embodiment the AIM pins the agent's code store and configuration data in physical memory and records the values used for relocation fix-ups. As used herein relocation fix-ups refer to changes to the binary code of the agent that allow the program to execute in the specific memory location into which it is loaded and allow the program to address symbols that exist outside its program code (e.g., functions in DLLs, OS service functions). Additionally the AIM records the actual offsets used for relocation fix-ups. In one embodiment the areas of the agent to be fixed-up are recorded in the agent's integrity manifest. The AIM can provide data to specify the values to which the agent was fixed up. This data is preserved to enable the measurement engine to invert the relocation step when it measures the agent to verify the integrity of the agent. In one embodiment the measurement engine can reconstruct a virtual to physical memory mapping of one or more pages associated with the measured agent. Thus, the AIM may not need to provide contiguous physical memory regions to provide measurement, as long as contiguous virtual memory regions are used. In one embodiment a virtual memory translation capability can be used by the measurement engine to do more advanced actions on the host system, for example, recognizing when a page is not in physical memory, and subsequently triggering a page fault to cause the page to be loaded to physical memory.

Once the agent content has been read into memory local to the measurement engine, the measurement engine inverts the relocation fix-ups that occurred at the time the agent was loaded. If a check value, or ICV, were computed using the agent content as it existed in host memory without inverting the location fix-ups, or back tracking the memory reference values to their original offsets, the result would not match an expected ICV, even if the program had not been modified by an attack. In one embodiment the measurement engine walks through a list of relocation fix-ups indicated in the integrity manifest and in essence reverses the relocation process performed by the loader at the time the program was loaded. Reversing the relocation process performed by the loader enables the management engine to determine the original memory offsets of function/service calls in the agent to allow the management engine to determine if an ICV computed on the agent content resident in host system memory indeed matches an ICV that references the original source content of the host system storage.

In one embodiment an ICV is generated with a cryptographic hashing algorithm. The algorithm can be used to generate one or more ICVs that are stored in the agent's integrity manifest. An ICV stored in the agent's integrity manifest can be referred to as an "original ICV." The original ICV may also be referred to herein as a "known good" ICV. The management engine can generate an ICV to compare to an original ICV with the same cryptographic hashing algorithm used to create the original ICV. The computed ICV is compared with the known good ICV. If the ICVs match, the agent is determined to have not been modified. If there is a difference in the computed ICV, the agent is determined by the management engine to have been modified, and the differences can be reported and/or acted on. In one embodiment memory restrictions and/or efficiency restrictions may prevent the measurement engine from storing the entire agent being measured in its local memory. In such a case, the management engine may perform the measurement by copying and measuring small portions at a time. Other variations are also possible, as will be understood by one skilled in the art.

In addition to the ICVs, the integrity manifest can include a cryptographic signature across the ICVs. The integrity manifest signature can be created by a software manufacturer/developer, and stored with an integrity manifest that is part of the software. The signature could alternatively be generated or received at install of the software program and stored as part of the program. The signature can be a cryptographic hash of the generated ICVs of the various parts of the software program. In one embodiment the cryptographic hash is performed by the software developer with a private key of a public-private key pair. Thus, the software developer can create and store the signature of the integrity manifest, and another entity (e.g., the measurement engine) can verify the signature with the software developer's public key. By verifying the signature of the integrity manifest, the measurement engine can assume that all values in the integrity manifest are correct, and use the ICVs of the integrity manifest as expected values for verification by the measurement engine, or another entity. Thus, the system can be protected against an attacker forging or modifying ICVs in the integrity manifest to match program contents that the attacker has modified.

If the integrity check is one performed at initialization, the measurement engine can compute anew ICV for future integrity checks, which will enable the measurement engine to skip performing relocation fix-up inversion during subsequent integrity checks. An ICV of an agent that has been positively identified and had its integrity verified can be performed using the agent's code store and configuration data exactly as it exists in the memory of the measurement engine that was used for the registration-time integrity check. Computation of such an ICV would not require relocation related changes to be performed. The computation of the ICV enables the measurement engine to perform the same procedure, without relocation work and without copying the code to the service processor memory, to verify the agent is unchanged from its original state.

The measurement engine may receive periodic indicators from an agent, generated by the agent to indicate that the agent is running. Such indicators may be considered to be "heartbeat" signals. The indicators can be received by the agent sending the signals to the measurement engine, or through the measurement engine performing functions to read an indicator. In one embodiment the agent passes the signals via a secure mechanism of identity-based message passing. The identity-based message passing allows an agent to prove its identity by indicating its inherent identity. Additional details of identity-based message passing are described in co-pending U.S. patent application Ser. No. 11/096,591, entitled "Hardware Based Authentication of a Software Program," filed Mar. 31, 2005.

More particular description of certain implementations and embodiments follows in reference to the Figures.

Figure 1:
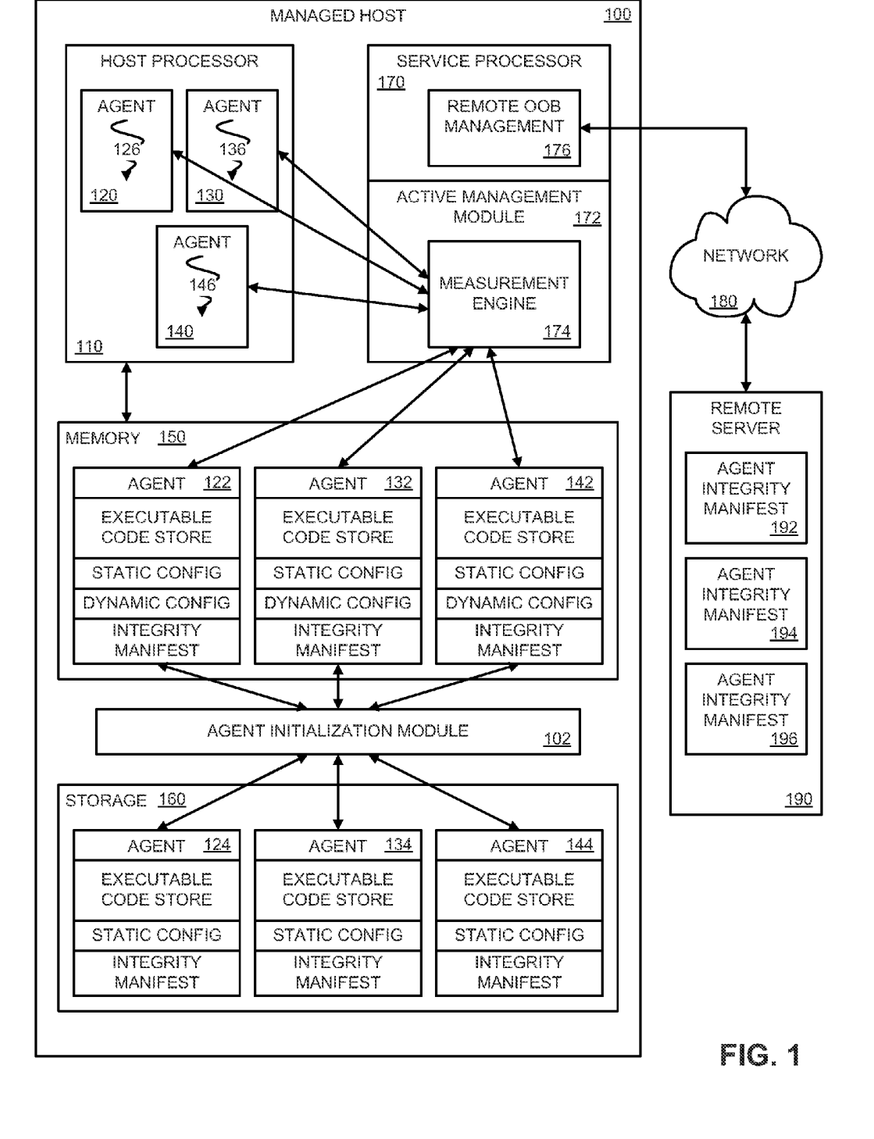
FIG. 1 is a block diagram of an embodiment of a host system with a service processor having an active management module and measurement engine.

FIG. 1 is a block diagram of an embodiment of a host system with a service processor having an active management module and measurement engine. Managed host 100 represents an electronic system or system that executes programs. Managed system 100 may be, for example, a desktop computer, a laptop computer, a personal digital assistant (PDA) or other ha (held computing or communication device, a server, etc. Host system 100 may include host processor 110, which represents a processor, microcontroller, central processing unit (CPU), etc. Although shown as a single unit in FIG. 1, host processor 110 should be understood as potentially including one or more processing cores or processing units, including parallel processing capability.

Host processor 110 may have one or more software programs, represented by agents 120, 130, and 140. The number of agents shown is merely representative of the ability to potentially monitor multiple agents, and is not to be understood as necessary or restrictive. Any number of measured agents can be supported, from one to multiple. The constraints on number of measured agents could be, for example, system resource availability of managed host 100, processing cycles available on measurement engine 174, and/or bandwidth of an interface to service processor 170. Agents 120, 130, and 140 are executed on host processor 110, and may include individual software programs, kernels, executable threads, etc. Examples of agents include antivirus software, intrusion detection systems (IDs), firewalls, OS invariants, etc. Each agent 120, 130, and 140 includes a process or executable flow 126, 136, and 146, respectively. The flows 126, 136, and 146 represent various functions that each corresponding agent may perform, or services that the agents may provide. Agents 120, 130, and 140 are understood to be in execution on host processor 110, and corresponding versions or source for the agents is represented in other places in FIG. 1. The significance of each will be described in more detail below.

Managed host 100 includes memory 150, which may store/provide instructions and/or data to use for execution to direct operation and/or functions of host processor 110. Memory 150 may include random access memory (RAM), and may include one or more of the following: static RAM (SRAM), dynamic RAM (DRAM), synchronous DRAM (SDRAM), dual-data rate RAM (DDRRAM), etc. Memory 150 may include one or more sequences of code and/or data stored therein, and may be referred to as an operating memory. A code sequence can be a set or a group of machine instructions representing one or more function calls, one or more subroutines, or one or more operations. A program or agent may refer herein to any one of these alone, as well as a conjunction of one or more of these.

Managed host 100 also includes storage 160, which represents a non-volatile storage to store persistent data. Non-volatile storage refers to a medium of storage that retains its value even when power is removed from the storage. Persistent data refers to data that is desired to be retained when power is interrupted to managed host 100, for example, system files, operating system(s), program files, configuration files, etc. Storage can include disks and associated drives (e.g., magnetic, optical), universal serial bus (USB) storage devices and associated ports, flash memory, read only memory (ROW, non-volatile semiconductor drives, etc.

In one embodiment storage 160 includes agents 124, 134, and 144, which represent the persistent store of source code for agents 120, 130, and 140, respectively, that are loaded as agents 122, 132 and 142, respectively, to be executed on host processor 110. Storage 160 may be a storage resource physically part of managed host 110, or it may be a storage resource accessible to managed host 110, hut not necessarily part of the same physical system. For example, storage 160 could be located over a network. In storage 160, each agent 124, 134, and 144 include an executable code store that may have executable files or code segments, links to other routines (e.g., a call to a dynamic linked library (DLL)), a data segment, etc. The executable code store provides the functionality of the agent. The agents also include a static configuration to indicate settings associated with the respective agent. The agents can also include dynamic configuration data. In one embodiment one or more programs or agents in storage 160 includes an integrity manifest, as shown for agents 124, 134, and 144. The integrity manifest can be as described above, with one or more integrity check values, and relocation fix-ups locations, covering the code store of the agents and/or the static and/or dynamic configuration settings/data associated with the agents.

Although each agent 124, 134, and 144 is understood to be potentially very different, the operation on the agents is similar for purposes of the discussion of monitoring their integrity, so description herein will be limited to agent 124. Agent 124 is loaded from storage 160 into memory 150 to be able to execute the program. In one embodiment a loader (not shown)

performs the loading function(s). Loading agent 124 will include providing offsets to indicate an actual location memory where a function call or other routine call or program call can be found in physical memory. For example, the executable code store of agent 124 may be written with a default value provided for a default memory location to find a called function from a DLL. In operation the actual location in physical memory of the DLL function call is likely to be somewhere other than the default location indicated in the executable code store. Thus, the loader provides the relocation fix-up value to enable agent 124 to make the function call. In one embodiment agent initialization module 102 provides the actual offsets used for relocation fix-ups, which is in contrast to what is normally performed by loaders. Additionally, agent module 102 may perform the functions of a traditional loader. The areas to be fixed up can be indicated in the integrity Thy manifest of agent 124, and are provided with the data to specify the value to which each area is fixed up, which can be stored in the integrity manifest of agent 122 as loaded in memory 150. Agent 122 additionally includes dynamic configuration data, which represents configuration settings that can be dynamically modified during run-time operation of the program.

In one embodiment managed host 100 includes service processor 170, which represents a processor/control logic for performing tasks outside the context of host processor 110. Service processor 170 may be termed an "adjunct processor," and may be a partition of host processor 110, an embedded device, a chipset component, etc. Service processor 170 may also be implemented by the host processor 110 when it executes management code on a secured/trusted partition or in a system management mode. In one embodiment service processor 170 includes active management module 172. Active management module 172 could alternatively exist as a separate entity on managed host 100 that works in conjunction with service processor 170. Active management module 172 includes a measurement engine 174 that obtains/receives information related to, for example, agent 120 executing a host processor 110.

In one embodiment measurement engine 174 includes a DMA connection to memory 150 to obtain information regarding measured agent 120. For example, measurement engine 174 may read the integrity manifest of the corresponding agent 122 stored in memory 150 to determine that agent 120 is indeed agent 122 of memory 150, and not an imposter as may be generated by an attack. Thus, flow 126 could be verified to be valid and allowed to execute its functions. The DMA connection (not numbered in FIG. 1) represents control logic (hardware and/or software), controllers, buses, etc., to provide access to the loaded program information for agent 122 stored in storage 150 without processing of the information by processor 110. In this manner measurement engine 174 can operate outside the context of an OS or other application executing on host processor 110.

In one embodiment service processor 172 includes remote out-of-band (OOB) management 176. OOB management refers to management an for control of a communication resource that is inaccessible to an OS executing on host processor 110. Remote OOB management 176 refers to a communication link with an entity external to managed host 100 over network 180. The communication link can be wired or wireless, and a wired link could be via twisted pair (e.g., (Cat-5), coaxial cable, etc. In one embodiment remote server 190 is connected to remote OOB management 176. Remote server 190 could include agent integrity manifests 192-196, which correspond to agent 122, 132, and 142 of memory 150. The integrity manifests may be provided with advanced knowledge of the agents to be operated on managed host 100 and/or service processor 170 could pass the information to remote server 190. With a knowledge of the integrity manifests, remote server 190 could provide an alternate mechanism to measure and/or manage agents 120, 130, and 140 to verify their identity and integrity.

Figure 2:
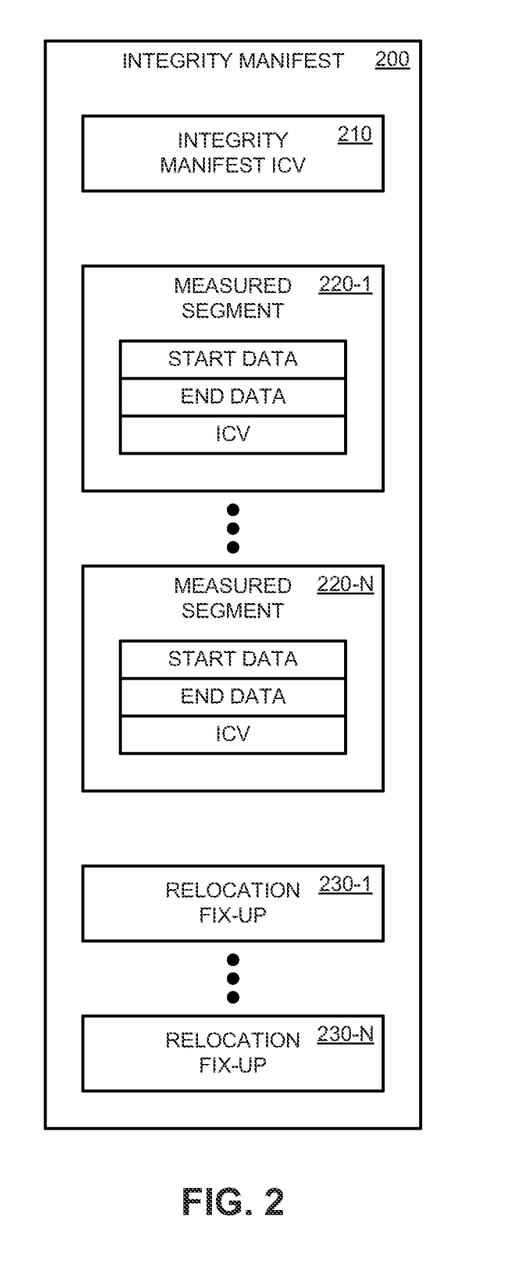
FIG. 2 is a block diagram of an embodiment of an integrity manifest.

FIG. 2 is a block diagram of an embodiment of an integrity manifest. Integrity manifest 200 represents one embodiment of an integrity manifest associated with the agents of FIG. 1. Integrity manifest 200 may include an integrity manifest integrity check value (ICV) 210. Integrity manifest ICV 210 represents an agent signature, or some other signing of integrity manifest 200 to attest its validity. For example, once the information that makes up integrity manifest 200 is obtained, a cryptographic hash may be performed and the result stored as a signature covering the various fields of integrity manifest 200. The resulting hash value can be placed in integrity manifest 200 as a check/compare value for a reading entity to determine the validity of the manifest. In one embodiment the cryptographic hash is based on both the fields of integrity manifest 200, as well as a private key of an asymmetric key pair of a developer of the software with which integrity manifest 200 will be associated. An entity reading/verifying integrity manifest 200 could check integrity manifest ICV 210 to determine the validity of integrity manifest 200 with the public key of the asymmetric key pair. In one embodiment the reading entity assumes the other values in integrity manifest 200 are correct if integrity manifest ICV 210 verifies properly.

Integrity manifest 200 also includes information to indicate the validity of the agent to which the manifest belongs, or is associated. For example, integrity manifest can include measured segments 220-1 through 220-N. A measured segment may include start data and end data to indicate the section of the agent source code to which it pertains. An ICV can be performed on the section of agent code indicated by the start and end data and placed in the measured segment. The ICV is generated through the use of a check algorithm that produces a value. Thus, the algorithm can be performed on a section (indicated by the start and end data) of the source code for an agent, and the ICV obtained. Performing the algorithm on the agent code in the host memory should produce a determinable result (i.e., either the same result, or a result that varies in an expected way, as described in more detail below). Multiple sections of the source code could be checked with the same or differing algorithms to generate ICVs. Additionally, one or more selected sections of the source code could be checked, up to checking the entirety of the code source. In one embodiment the start and end data are the start and end of the measured agent.

In addition to the measured segments, integrity manifest 200 includes relocation fix-ups 230-1 through 230-N. The relocation fix-ups indicate a reference in the source code of the measured agent to another routine or function. The routine or function can refer to another part of the code (e.g., segment relocation), or a function call external to the measured agent (e.g., symbol relocation). The routine or function may be to routines within the same software program (i.e., internal reference), or to libraries, functions/routines common to multiple programs, system routines, etc. (i.e., external reference). These types of relocation fix-ups are intended to be illustrative and not restrictive, as other types of relocation could also be supported depending on the specific object file format in use. Just as the agent itself may be dynamically loaded into memory, the external function may be dynamically loaded, and will not necessarily have a constant address. One example may be a routine referenced in a DLL. The source code may refer to a memory address for the function that does not correspond to the actual location of the function in physical memory. The loader indicates to the agent the correct memory location of the function when the agent is loaded. The relocation fix-ups may thus also include the actual values of the correct physical memory locations of the corresponding functions. In one embodiment different subroutines that make up an agent are stored in separate, dynamically assigned memory locations. The relocation fix-ups could thus apply to internal function calls in a similar fashion as described for external function calls.

Because the locations of the certain functions may change, integrity manifest 200 as determined for an agent in storage may differ once loaded to memory. When loaded to memory, the relocation values can be added to the information in integrity manifest 200. Integrity manifest ICV 210, or the integrity manifest signature, can be checked for the loaded program, and the data within integrity manifest 200 used to verify the identity of an associated agent. Thus, if the actual offsets in memory are known for the indicated relocation fix-ups, they can be stored in memory, and the differences can be determined for an integrity manifest 200 as applied to an agent in memory. The process of verifying the manifests and their associated agents is described in more detail below.

In one embodiment the various sections of integrity manifest 200 are located in contiguous memory locations, or are contiguously stored, or are contiguous parts of a datastructure. However, the various sections of integrity manifest 200 are not necessarily contiguous. In an alternate embodiment one or more sections of integrity manifest 200 are located in non-contiguous memory locations. In an alternate embodiment one or more sections of integrity manifest 200 are not structurally contiguous, hut occupy non-contiguous locations of a datastructure.

Figure 3:
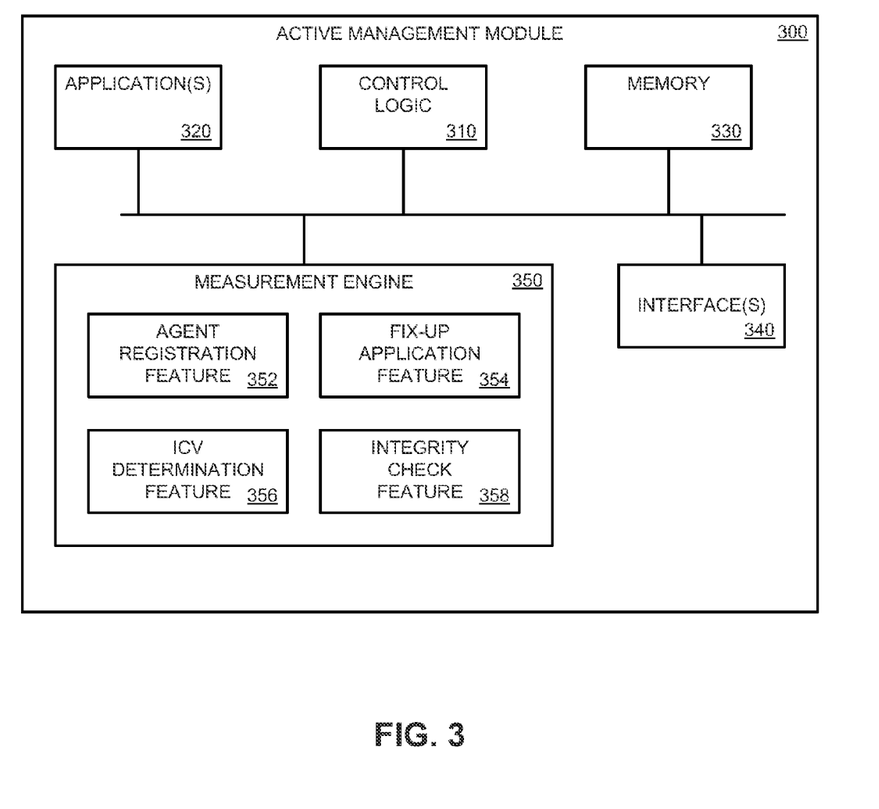
FIG. 3 is a block diagram of an embodiment of an active management module with a measurement engine.

FIG. 3 is a block diagram of an embodiment of an active management module with a measurement engine. Active management module 300 and measurement engine 350 are examples of active management module 170 and measurement engine 174, respectively, of FIG. 1. Active management module 300 includes control logic 310, which implements logical functional control to direct operation of module 300, and/or hardware associated with directing operation of module 300. In one embodiment module 300 includes one or more applications 320, which represent code sequences and/or programs that provide instructions to control logic 310. Module 300 includes memory 330 and/or access to memory resource 330 for storing data and/or instructions. The data and instructions are used in the operation of control logic 310. Module 300 also includes one or more interfaces 340, which represent access interfaces to/from module 300 with regard to entities (electronic or human) external to module 300.

Module 300 includes measurement engine 350, which represents one or more functions that enable module 300 to measure and monitor an agent to verify the identity and/or integrity of the agent. Functions of measurement engine 350 may include, but are not limited to, agent registration feature 352, fix-up application feature 354, ICV determination feature 356, and integrity check feature 358. Other features may be included, making other versions of measurement engine 350 that are more or less complex than what is shown in FIG. 3.

Agent registration feature 352 enables measurement engine 350 to register agents that are loaded into memory. When an agent is loaded into memory, the loader traditionally applies relocation fix-ups for external function calls. The relocation fix-ups can be indicated in an integrity manifest associated with the agent. The integrity manifest can also include the relocation offsets. An agent may register or be registered with measurement engine 350 for measurement engine 350 to monitor the agent. An agent registered with measurement engine 350 may be referred to as a "measured agent."

Fix-up application feature 354 enables measurement engine 350 to apply the relocation fix-ups to determine a difference between a known good ICV or known good integrity manifest and an ICV or integrity manifest determined from an agent loaded in memory that has dynamic values in place of default memory locations referencing function calls loaded to dynamically assigned physical memory locations. In essence fix-up application feature 350 may perform the reverse of the operation of the loader in determining the applicable offsets.

ICV determination feature 356 enables measurement engine 350 to perform a check algorithm on one or more sections of source code, either stored or in memory, to determine a check value for an agent. An agent may have multiple check values or ICVs associated with it. The algorithm could be, for example, a cryptographic hash function. The ICVs can be determined for an agent loaded in memory and compared against known good values, for example, values computed prior to loading the agent into memory.

Integrity check feature 358 enables measurement engine 350 to compare ICVs computed on an agent prior to be loaded into memory with ICVs computed after, or in conjunction with an agent being loaded into memory. Integrity checks can be performed at the time an agent is loaded into memory, after the agent is loaded into memory, at timed intervals, and/or in an event-driven manner. The integrity check can verify the agent is properly loaded into memory and is functioning. Integrity checks on the agent after loading the agent into memory can be performed to determine that an agent is not compromised. Timed intervals are those determined by a timing mechanism (e.g., a timer), and event-driven intervals are those determined by the occurrence of an event (e.g., a function call, an interrupt, an administrator-quest, etc.).

Figure 4:
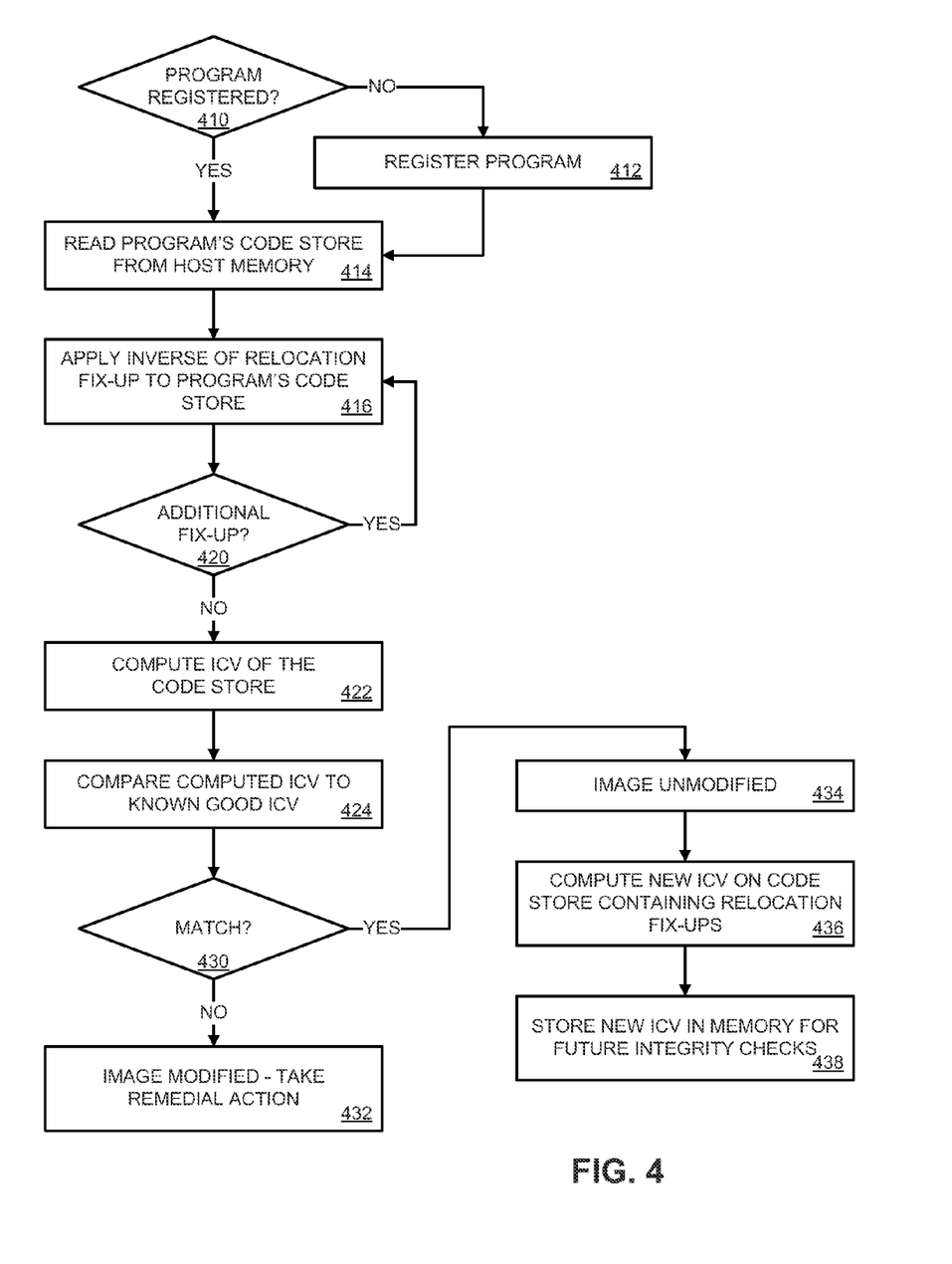
FIG. 4 is a flow diagram of an embodiment of performing an integrity check on a software program.

Active management module 300 may include hardware, software, and/or a combination of these. In a case where module 300 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e. stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

FIG. 4 is a flow diagram of an embodiment of performing an integrity check on a software program. The flow diagram of FIG. 4 can apply to an integrity check on an agent at the time of loading the program into memory, or periodically, or in an eventdriven manner. A measurement engine or a program initialization or loader determines if an program is registered, 410. If the program is not registered, the measurement engine registers the program to be able to monitor the integrity of the program, 412. Alternately, the measurement engine could be preconfigured with the information about the measured program necessary to do its work (e.g., where to find the program's code and integrity manifest) using a pre-existing out of band provisioning mechanism. The measurement engine reads the program's code store from host memory, 414. In one embodiment the program's code store includes an integrity manifest to indicate relocation fix-ups and offsets to the measurement engine. The measurement engine applies the inverse of the relocation fix-ups to the program's code store to determine the original state of the program's source code, 416. The measurement engine can repeat this process for each relocation fix-up indicated in the integrity manifest by searching the code for additional fix-ups, 420.

When the relocation fix-ups have been reversed, the measurement engine can compute an ICV for one or more sections of the code store, static configuration data, or dynamic configuration data, 422. The generated values should match known good ICVs for the same section(s) of the code store. The computed ICV is compared to the known good ICV, 424, and the measurement engine determines if the values match, 430. If the values do not match, the measurement engine determines that the image of the program as stored in memory has been modified, and causes remedial action to be taken. The measurement engine can perform remedial operations and/or indicate the failure to another entity that will take remedial action. If the values match, the measurement engine determines that the image is unmodified, 434. In one embodiment the measurement engine performs a similar process as described above for each instance of a measured agent. In an alternate embodiment the measurement engine computes a new ICV on the code store image contained in memory that contains the relocation fix-ups, 436, which can be stored in memory on the measurement engine or in another secure location for future integrity checks, 438. Computing the new ICV may prevent the measurement engine from having to apply the inverse of the relocation fix-ups on future integrity checks.

Figure 5:
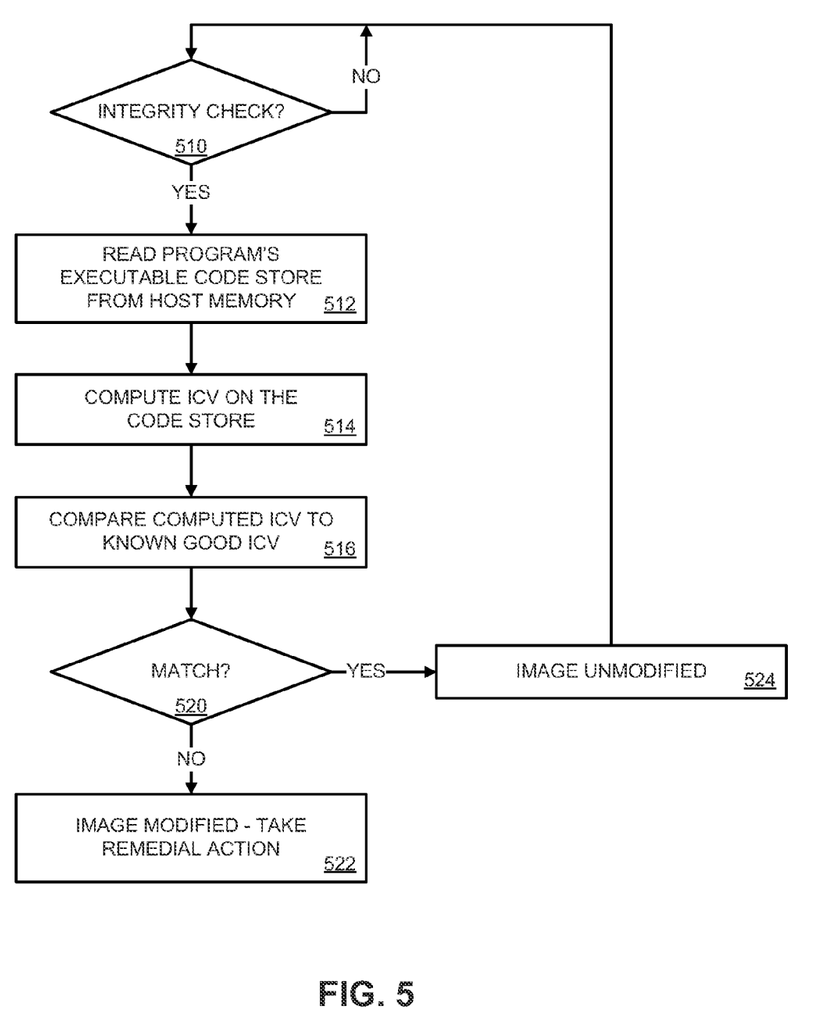
FIG. 5 is another flow diagram of an embodiment of performing an integrity check on a software program.

FIG. 5 is another flow diagram of an embodiment of performing an integrity check on a software program. If a program has been registered and had an ICV computed for the image of the program in memory, the measurement engine can make periodic integrity checks. When the measurement engine determines it should make an integrity check (e.g., with a timing mechanism, an event, etc.), 510, the measurement engine reads the program's executable code store from host memory, 512. The measurement engine may read the code store via DMA, or some other mechanism. The measurement engine computes an ICV on the code store using an ICV algorithm used to generate a known good ICV, 514, and compares the computed ICV to the known good ICV, 516. If the values do not match, 520, the image in memory is determined to have an unauthorized modification, and remedial action is triggered, 522. Remedial action may include halting operation of the program, alerting a system administrator, ceasing the program and removing its image from memory, etc. If the ICVs match, the image is determined to be unmodified, 524, and the measurement engine waits until the next integrity check is triggered to check the program again.

Figure 6:
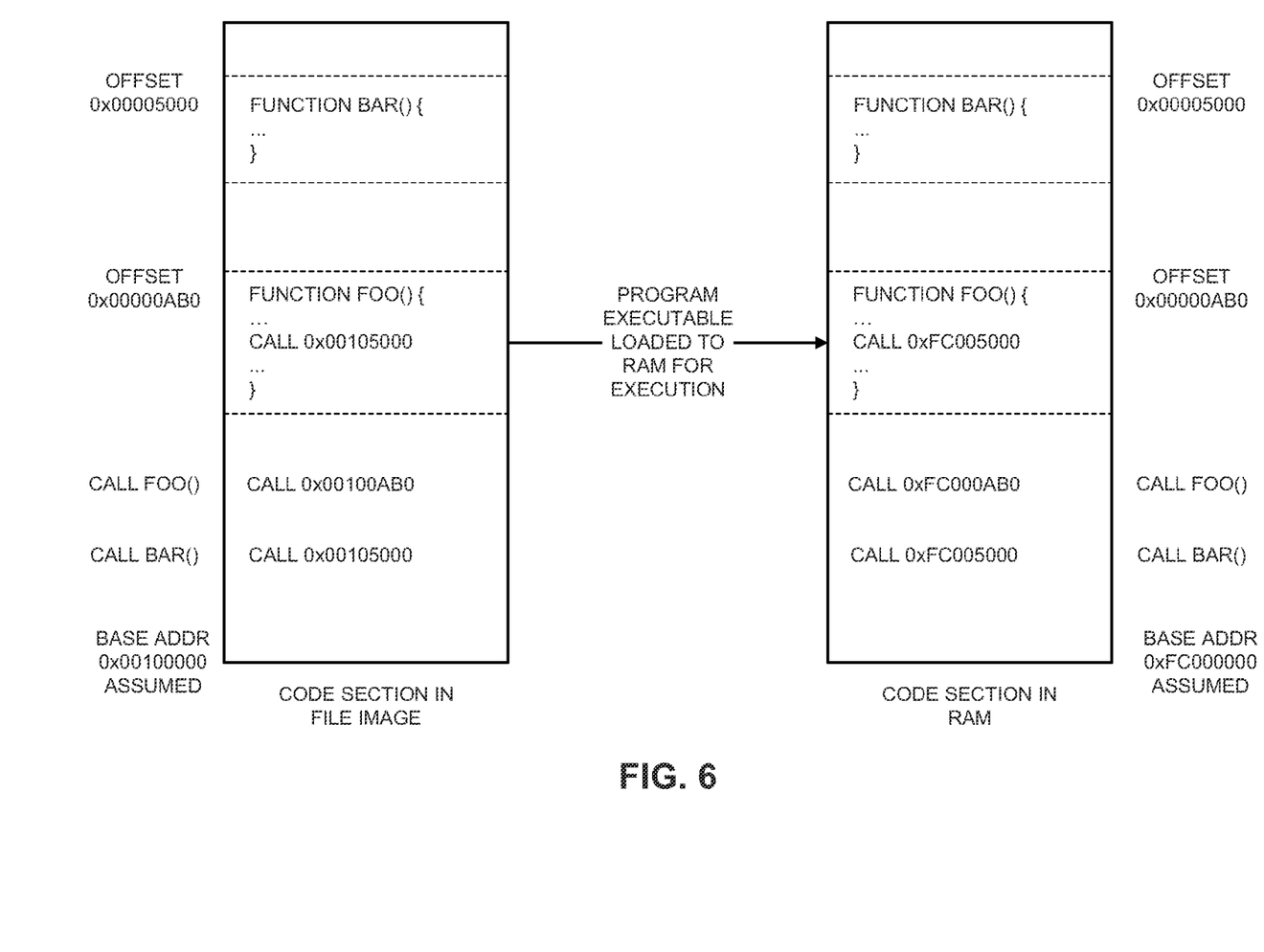
FIG. 6 is a block diagram of an embodiment of a scenario where an integrity manifest could be used.

FIG. 6 is a block diagram of an embodiment of a scenario where an integrity manifest could be used. The code section in the file image is an agent as it exists in storage. The agent a symbol named "BAR." Within the agent represented by the code section in the file image is a table of relocation fix-ups containing a single entry for the "BAR" symbol. The exact format of the relocation fix-up depends on the object file format, and may include a value for the relative address within the code segment where "BAR" is located, and an index into a fix-up table that contains the real value for "BAR." In this example, the relative address is 0x105000, the index in the fix-up table is 0x1, and the value in the fix-up table at index 0x1 is 0x105000. The assumed base address for the code at the relative address of 0x105000 at the time the original ICV is computed is 0x100000.

At load time, the loader moves the location of "BAR" to 0xFC005000, if the actual base address where the code is loaded in memory is 0xFC000000. With knowledge of the actual base address where the code is loaded, the measurement engine revert the relocation value its original value to verify the integrity of the agent. The measurement engine can compute a new ICV to perform the integrity check by using the offset value of 0xFBF00000 to determine the relocated memory location (0xFC005000) minus the offset value (0xFBF00000) to determine a value of 0x00105000. The determined value can be compared with the original value in the code section in the file image to determine that the function is at the correct address.

If a malicious program modified the value of "BAR" to point to address 0xFC008000 where the a "destroy_computer( )" function was located, the measurement engine would compute 0xFC008000−0xFBF00000=0x108000 to result in the generation of an it expect value (i.e., not the expected value 0x105000), indicating the modification.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An article of manufacture comprising a non-transitory computer readable storage medium having content stored thereon to provide instructions which, when executed, result in a performance of operations including:

loading, by an active management platform, a known good integrity check value into a memory local to a measurement engine of the active management platform, the active management platform and measurement engine executed outside a context of a host operating system on which an agent in system memory is executed, the active management platform and measurement engine executed on a same hardware host machine as the agent, and executed on processing resources inaccessible to the host operating system;

computing, by the measurement engine, an algorithm on a section of agent code of the agent in system memory to generate an integrity check value for the agent in system memory, which represents an identify of the section of agent code as a hash value of executable code, static configuration data, and relocation fix-ups for the section of agent code, wherein the section of agent code is kept in system memory by an agent initialization module that records values used for relocation fix-ups; and comparing the generated integrity check value with the known good integrity check value to determine when the generated and known good integrity check values match, to detect when the agent has been modified from a known good state.

2. An article of manufacture according to claim 1, further comprising the content to provide instructions to result in:
determining for a dynamically assigned address referenced within the agent a memory address offset as applied to the dynamically assigned address in conjunction with loading the agent into the system memory;
wherein computing the algorithm to generate the integrity check value on the portion of the agent comprises reversing the offset to determine a pre-offset value for the dynamically assigned address referenced within the agent, and computing the algorithm on the section of agent code of the agent with the pre-offset value.

3. An article of manufacture according to claim 2, wherein the dynamically assigned address referenced within the agent comprises a dynamically addressed function call.

4. An article of manufacture according to claim 1, further comprising the content to provide instructions to result in:
halting execution of the software program if the generated integrity check value and the expected value do not match.

5. An article of manufacture according to claim 1, further comprising the content to provide instructions to result in:
generating the integrity check value in response to occurrence of an integrity check event, including at least one occurrence from the group consisting of: a configuration parameter change, a data packet transmission, or terminate execution of the software program.

6. An article of manufacture according to claim 1, further comprising the content to provide instructions to result in:
obtaining information pinned to a memory location by an agent initialization module in the agent's code, the information used to compute the algorithm.

7. An article of manufacture according to claim 1, further comprising the content to provide instructions to result in:
registering the agent as an agent to be monitored by the measurement engine, wherein the comparing is performed at registration of the agent.

8. A method comprising:
loading, by an active management platform, a known good integrity check value into a memory local to a measurement engine of the active management platform, the active management platform and measurement engine executed outside a context of a host operating system on which an agent in system memory is executed, the active management platform and measurement engine executed on a same hardware host machine as the agent, and executed on processing resources inaccessible to the host operating system;
computing, by the measurement engine, an algorithm on a section of agent code of the agent in system memory to generate an integrity check value for the agent in system memory, which represents an identify of the section of agent code as a hash value of executable code, static configuration data, and relocation fix-ups for the section of agent code, wherein the section of agent code is kept in system memory by an agent initialization module that records values used for relocation fix-ups; and
comparing the generated integrity check value with the known good integrity check value to determine when the generated and known good integrity check values match, to detect when the agent has been modified from a known good state.

9. A method according to claim 8, further comprising:
determining for a dynamically assigned address referenced within the agent a memory address offset as applied to the dynamically assigned address in conjunction with loading the agent into the system memory;
wherein computing the algorithm to generate the integrity check value on the portion of the agent comprises reversing the offset to determine a pre-offset value for the dynamically assigned address referenced within the agent, and computing the algorithm on the section of agent code of the agent with the pre-offset value.

10. A method according to claim 8, wherein the dynamically assigned address referenced within the agent comprises a dynamically addressed function call.

11. A method according to claim 8, further comprising:
halting execution of the software program if the generated integrity check value and the expected value do not match.

12. A method according to claim 8, further comprising:
generating the integrity check value in response to occurrence of an integrity check event, including at least one occurrence from the group consisting of: a configuration parameter change, a data packet transmission, or terminate execution of the software program.

13. A method according to claim 8, wherein computing the algorithm further comprises:
obtaining information pinned to a memory location by an agent initialization module in the agent's code, the information used to compute the algorithm.

14. A method according to claim 8, further comprising:
registering the agent as an agent to be monitored by the measurement engine, wherein the comparing is performed at registration of the agent.

15. A system comprising:
a host processor on a hardware host machine to execute a host operating system and programs under the operating system, including an agent loaded into memory from a storage device;
a service processor on the hardware host machine having processing resources separate from the host processor, the service processor to execute an active management platform, and to
load a known good integrity check value into a memory local to a measurement engine of the active management platform;
compute an algorithm on a section of agent code of the agent in system memory to generate an integrity check value for the agent in system memory, which represents an identify of the section of agent code as a hash value of executable code, static configuration data, and relocation fix-ups for the section of agent code, wherein the section of agent code is kept in system memory by an agent initialization module that records values used for relocation fix-ups; and
compare the generated integrity check value with the known good integrity check value to determine when the generated and known good integrity check values match, to detect when the agent has been modified from a known good state.

16. A system according to claim 15, wherein the service processor to further determining for a dynamically assigned address referenced within the agent a memory address offset as applied to the dynamically assigned address in conjunction with loading the agent into the system memory;

wherein computing the algorithm to generate the integrity check value on the portion of the agent comprises reversing the offset to determine a pre-offset value for the dynamically assigned address referenced within the agent, and computing the algorithm on the section of agent code of the agent with the pre-offset value.

17. A system according to claim 15, wherein the dynamically assigned address referenced within the agent comprises a dynamically addressed function call.

18. A system according to claim 15, wherein the service processor to further halt execution of the software program if the generated integrity check value and the expected value do not match.

19. A system according to claim 15, wherein the service processor to further generate the integrity check value in response to occurrence of an integrity check event, including at least one occurrence from the group consisting of: a configuration parameter change, a data packet transmission, or terminate execution of the software program.

20. A system according to claim 15, wherein the service processor to further obtain information pinned to a memory location by an agent initialization module in the agent's code, the information used to compute the algorithm.

21. A system according to claim 15, wherein the service processor to further
register the agent as an agent to be monitored by the measurement engine, wherein the comparing is performed at registration of the agent.

* * * * *